United States Patent
Kim et al.

(10) Patent No.: US 8,154,799 B2
(45) Date of Patent: *Apr. 10, 2012

(54) 2D/3D SWITCHABLE AUTOSTEREOSCOPIC DISPLAY APPARATUS AND METHOD

(75) Inventors: Yun-Tae Kim, Suwon-si (KR); Gee Young Sung, Daegu-si (KR); Du-Sik Park, Suwon-si (KR); Dong Kyung Nam, Yongin-si (KR); Ju Yong Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 413 days.

This patent is subject to a terminal disclaimer.

(21) Appl. No.: 12/385,761

(22) Filed: Apr. 17, 2009

(65) Prior Publication Data

US 2010/0073768 A1    Mar. 25, 2010

(30) Foreign Application Priority Data

Sep. 19, 2008    (KR) .................. 10-2008-0092045

(51) Int. Cl.
*G02B 27/22* (2006.01)
*H04N 13/04* (2006.01)
(52) U.S. Cl. ............. 359/463; 359/462; 348/59; 349/15
(58) Field of Classification Search .............. 359/462, 359/463; 349/15; 348/59
See application file for complete search history.

(56) References Cited

U.S. PATENT DOCUMENTS

| | | | | |
|---|---|---|---|---|
| 6,069,650 | A * | 5/2000 | Battersby | 348/59 |
| 7,079,107 | B2 * | 7/2006 | Miyake | 345/102 |
| 7,821,711 | B2 * | 10/2010 | Kim et al. | 359/463 |
| 2006/0050197 | A1 | 3/2006 | Hu et al. | |
| 2008/0186575 | A1 * | 8/2008 | Kim et al. | 359/463 |
| 2010/0079584 | A1 * | 4/2010 | Sung et al. | 348/52 |

FOREIGN PATENT DOCUMENTS

| | | |
|---|---|---|
| JP | 2000-98350 | 4/2000 |
| JP | 2007-24969 | 2/2007 |
| KR | 2003-0036765 | 5/2003 |
| KR | 10-2006-0065069 | 6/2006 |
| KR | 10-2006-0096314 | 9/2006 |
| KR | 10-2006-0105351 | 10/2006 |
| KR | 2008-0000425 | 1/2008 |
| KR | 10-2008-0039039 | 5/2008 |
| KR | 10-2008-0051135 | 6/2008 |
| KR | 10-2008-0069869 | 7/2008 |
| WO | 2005/011291 | 2/2005 |

OTHER PUBLICATIONS

U.S. Appl. No. 12/385,759, filed Apr. 17, 2009, Gee Young Sung, et al., Samsung Electronics Co., Ltd.

* cited by examiner

*Primary Examiner* — Audrey Y Chang
(74) *Attorney, Agent, or Firm* — Staas & Halsey LLP

(57) ABSTRACT

A two dimensional/three dimensional (2D/3D) switchable autostereoscopic display apparatus and method. The 2D/3D switchable autostereoscopic display apparatus and method may selectively display a 2D image and 3D image using two displays, control a display operated as backlight from among the two displays when displaying the 2D image, and thereby may increase a contrast. Also, the 2D/3D switchable autostereoscopic display apparatus and method may output a 2D object and a 3D background using two displays.

19 Claims, 11 Drawing Sheets

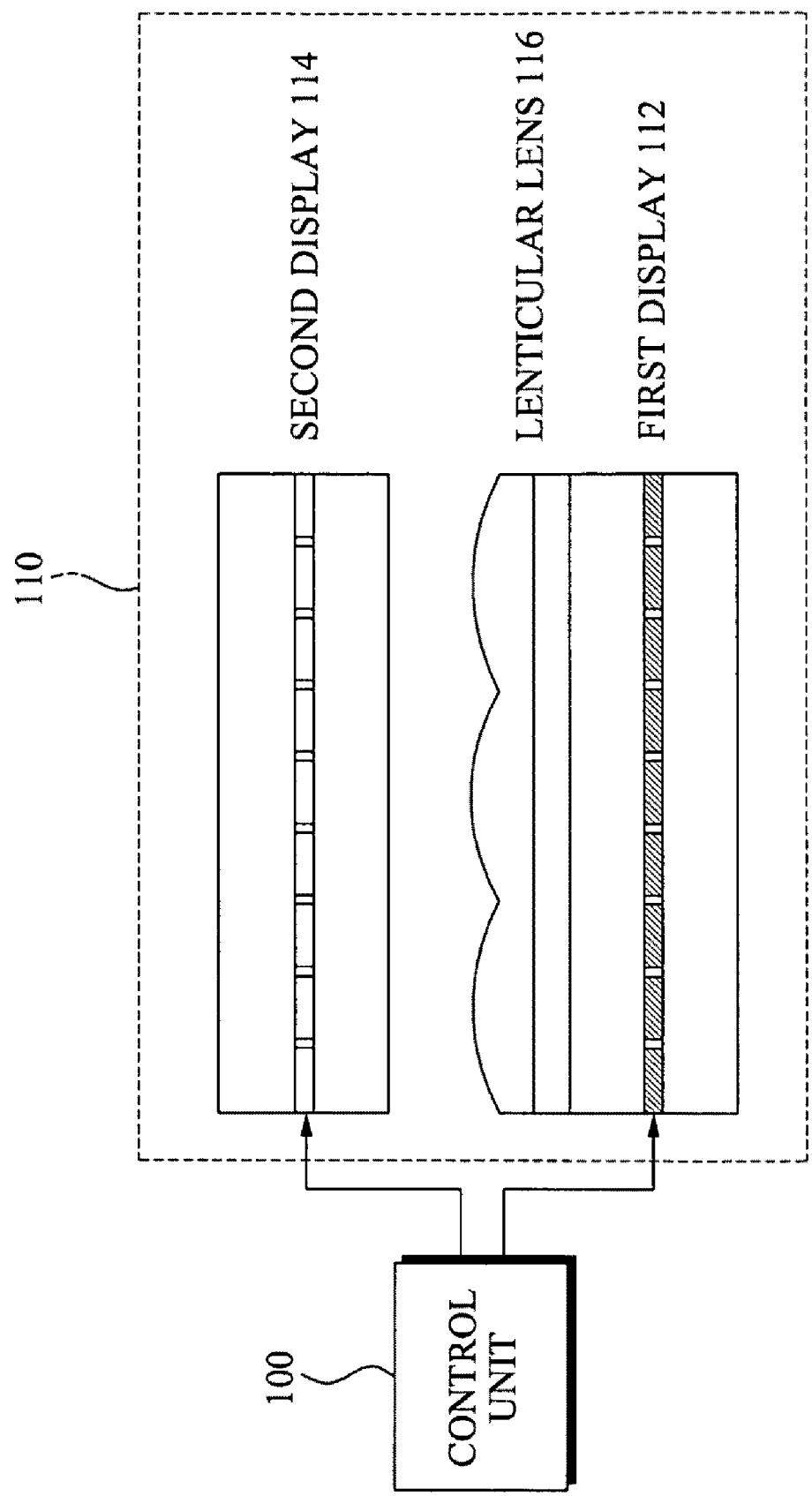

NORMAL MODE

NORMAL MODE

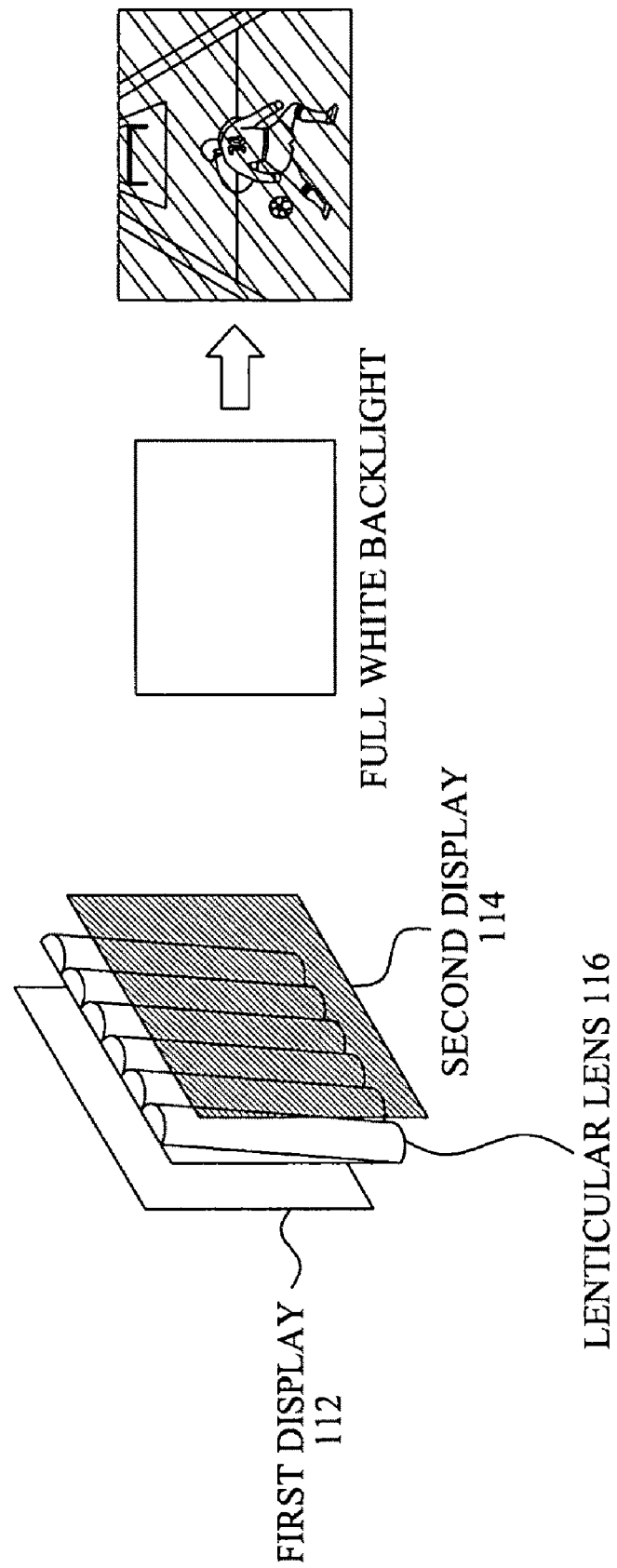

2D/3D SWITCHABLE AUTOSTEREOSCOPIC DISPLAY APPARATUS AND METHOD

CROSS-REFERENCE TO RELATED APPLICATIONS

This application claims the priority benefit of Korean Patent Application No. 10-2008-0092045, filed on Sep. 19, 2008, in the Korean Intellectual Property Office, the disclosure of which is incorporated herein by reference.

BACKGROUND

1. Field

Exemplary embodiments relate to a two dimensional/three dimensional (2D/3D) switchable autostereoscopic display apparatus and method, and more particularly, to an image display apparatus and method which may selectively display a 2D image or 3D image using two displays.

2. Description of the Related Art

In general, a method using binocular disparity is used to display a three dimensional (3D) image. A method using binocular disparity may be divided into stereoscopy and autostereoscopy depending on whether a user is required to wear glasses. A stereoscopy method may include a method of using polarized glasses or a method using Liquid Crystal (LC) shutter glasses. An autostereoscopy method may include a method of using lenticular lens, parallax barrier, parallax illumination, and the like.

A stereoscopy uses a polarized projector and is applied to a place where a number of people watch, for example, a theater. An autostereoscopy is mainly used for a game display, television, display for presentation, and the like.

A 3D image display apparatus displays a 3D image as well as a 2D image, and thus a 2D/3D switchable display technology is required. A 2D/3D switchable display technology may include an autostereoscopy method such as a method using a parallax barrier or using a lenticular lens.

In a parallax barrier method, a viewpoint is separated using a barrier in front of or at the back of display operating a pixel to display a 3D image. A parallax barrier method may electrically control turning on/off the barrier. Accordingly, when displaying a 3D image, a barrier may be used by turning on the barrier. When displaying a 2D image, a barrier may be used in a transparent mode by turning off the barrier. Although a resolution of a 2D image is almost the same as in a 2D display, a luminance of a 3D image may be significantly decreased since the parallax barrier method is for displaying a 3D image.

In a lenticular lens method, an LC lens is used, and 2D/3D images may be converted by controlling a refractive index of an inside and an outside of the LC lens. When a refractive index of an inside of LC lens is identical to that of an outside of LC lens, the LC lens may not function as a lens, and is utilized in a 2D image display mode. When the refractive indexes are different, the LC lens may function as a lens, and is utilized in a 3D image display mode. In a lenticular lens method, viewpoints are separated using an LC lens, and thus a luminance of a 3D image may not decrease. However, when a refractive index of an LC lens is not perfectly controlled, the quality of 2D and 3D images may be deteriorated.

SUMMARY

Exemplary embodiments may provide a two dimensional/three dimensional (2D/3D) switchable autostereoscopic display apparatus and method which may selectively display a 2D image and 3D image using two displays.

Exemplary embodiments may also provide a 2D/3D switchable autostereoscopic display apparatus and method which may selectively display a 2D image and a 3D image using two displays, control a display operated as backlight from among the two displays when displaying the 2D image, and thereby may increase a contrast.

Exemplary embodiments may also provide a 2D/3D switchable autostereoscopic display apparatus and method which may three dimensionally output an object and two dimensionally output a background using two displays.

According to exemplary embodiments, there may be provided a 2D/3D switchable autostereoscopic display apparatus, the apparatus including: a display unit to include a first display and a second display, and selectively output a 2D image or a 3D image through a lenticular lens located between the first display and the second display; and a control unit to control the first display and the second display to selectively output the 2D image or the 3D image.

When outputting the 2D image, the control unit may control the first display to be operated as backlight to provide the backlight to the lenticular lens, and control the second display to output the 2D image. Here, the second display may be provided with the backlight scattered through the lenticular lens.

When outputting the 2D image, the control unit may regionally control a brightness of the backlight, outputted through the first display, depending on an artifact of an outputted 2D image.

When outputting the 2D image, the control unit may control the first display to output a backlight image with a line pattern to remove a line artifact generated due to scattering by the lenticular lens. The line pattern may compensate for the line artifact.

When outputting the 2D image, the control unit may increase a frame rate of the 2D image by up to three times, control the first display to sequentially and repeatedly output red, green, and blue backlights, and control the second display to output an artifact of an image corresponding to each of the red, green, and blue backlights as black and white.

When outputting the 3D image, the control unit may control the second display to be operated in a transparent state, control the first display to output an image, and control the lenticular lens to refract light of the image to a plurality of viewpoints to output the 3D image.

The control unit may separate an object from a background in an image, control the first display to output the object, and control the second display to output the background excluding the object to output a hybrid 3D image where reduction of a resolution is reduced. Here, a background color of the object is white.

The lenticular lens may be angled by a predetermined angle between the first display and the second display to remove a moiré pattern.

The first display may correspond to any one of a Liquid Crystal Display (LCD), a Plasma Display Panel (PDP), an Organic Light Emitting Diode (OLED), and a Projection display.

The second display may correspond to any one of an LCD and an OLED.

The lenticular lens may refract light of an image provided from the first display to a plurality of viewpoints and outputs.

According to exemplary embodiments, there may be provided a 2D/3D switchable autostereoscopic display method, the image display method including: receiving a request for an output of a 2D image, a 3D image, or a hybrid 3D image; providing backlight to a lenticular lens through a first display when the output of the 2D image is requested; and outputting the 2D image through a second display provided with the backlight scattered through the lenticular lens when the output of the 2D image is requested.

A brightness of the backlight may be regionally controllable depending on an artifact of an image.

The backlight may have a line pattern for compensating for a line artifact to remove the line artifact generated due to scattering by the lenticular lens.

When the second display uses a black and white panel and the output of the 2D image is requested, the image display method further includes: increasing a frame rate of the 2D image to be outputted by up to three times; outputting red, green, and blue backlights through the first display sequentially and repeatedly; and outputting an artifact of an image corresponding to each of the red, green, and blue backlights as black and white through the second display.

When an output of a 3D image is requested, the image display method further includes: maintaining the second display to be transparent; outputting an image through the first display; and refracting light of the image outputted through the first display to a plurality of viewpoints through the lenticular lens to output the 3D image.

When an output of a hybrid 3D image is requested, the image display method further includes: separating an object from a background in an image to be outputted; outputting the object through the first display, a background color of the object being white; and outputting the background excluding the object through the second display.

The lenticular lens may be located between the first display and the second display.

The lenticular lens may refract light of an image provided from the first display into a plurality of viewpoints and outputs.

The first display may correspond to any one of an LCD, a PDP, an OLED, and a Projection display.

The second display may correspond to any one of an LCD and an OLED.

Additional aspects, features, and/or advantages of exemplary embodiments will be set forth in part in the description which follows and, in part, will be apparent from the description, or may be learned by practice of the disclosure.

BRIEF DESCRIPTION OF THE DRAWINGS

These and/or other aspects of exemplary embodiments will become apparent and more readily appreciated from the following description, taken in conjunction with the accompanying drawings of which:

FIG. 1 is a diagram illustrating a configuration of a two dimensional/three dimensional (2D/3D) switchable autostereoscopic display apparatus according to exemplary embodiments;

FIGS. 6A and 6B are diagrams illustrating an example of compensating for a luminance non-uniformity that may be generated when a 2D/3D switchable autostereoscopic display apparatus outputs a 2D image according to exemplary embodiments.

DETAILED DESCRIPTION

Figure 2A:
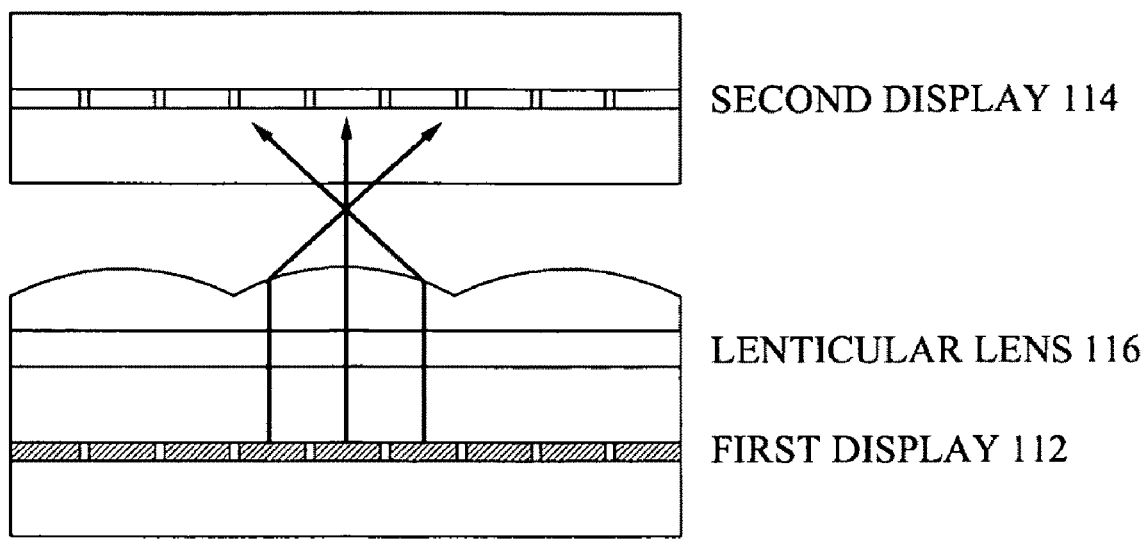
FIGS. 2A and 2B are diagrams illustrating an example of a section of a display unit when outputting a 3D image, and an example of an operation of outputting the 3D image according to exemplary embodiments.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 is a diagram illustrating a configuration of a two dimensional/three dimensional (2D/3D) switchable autostereoscopic display apparatus according to exemplary embodiments.

Referring to FIG. 1, the 2D/3D switchable autostereoscopic display apparatus may include a control unit 100 and a display unit 110. The display unit 110 may include a first display 112, second display 114, and lenticular lens 116.

The first display 112 may output an image when outputting a 3D image, and may be operated as backlight when outputting a 2D image under control of the control unit 100. When a hybrid 3D image is outputted, the first display 112 may output an object in colors and a background in white backlight under the control of the control unit 100 to reduce a resolution reduction. The first display 112 may correspond to any one of a Liquid Crystal Display (LCD), Plasma Display Panel (PDP), Organic Light Emitting Diode (OLED), and Projection display.

The second display 114 may output an image when outputting a 2D image, and be operated in a transparent state when outputting a 3D image under the control of the control unit 100. When the hybrid 3D image is outputted, the second display 114 may output only a background excluding the object under the control of the control unit 100 to reduce a resolution reduction. The second display 114 may correspond to any one of an LCD, PDP, OLED, and Projection display.

The lenticular lens 116 may be located between the first display 112 and the second displays 114. Pixels of the first display 112 may be displayed in a predetermined direction under the lenticular lens 116. Specifically, the pixels of the first display 112 may be outputted from a particular location to each of left and right eyes of an observer. Accordingly, the observer may look at images from two different viewpoints, and thus a 3D effect may be obtained. That is, the lenticular lens 116 may refract light of an image to the two, that is, left and right, viewpoints, and thus each of the left and right eyes of the observer may observe different images.

Here, a viewpoint may indicate a location of an observer observing an object. The refracting of the light of the image may indicate refracting light of an image to enable each different image to be observed at a plurality of locations.

Figure 2B:
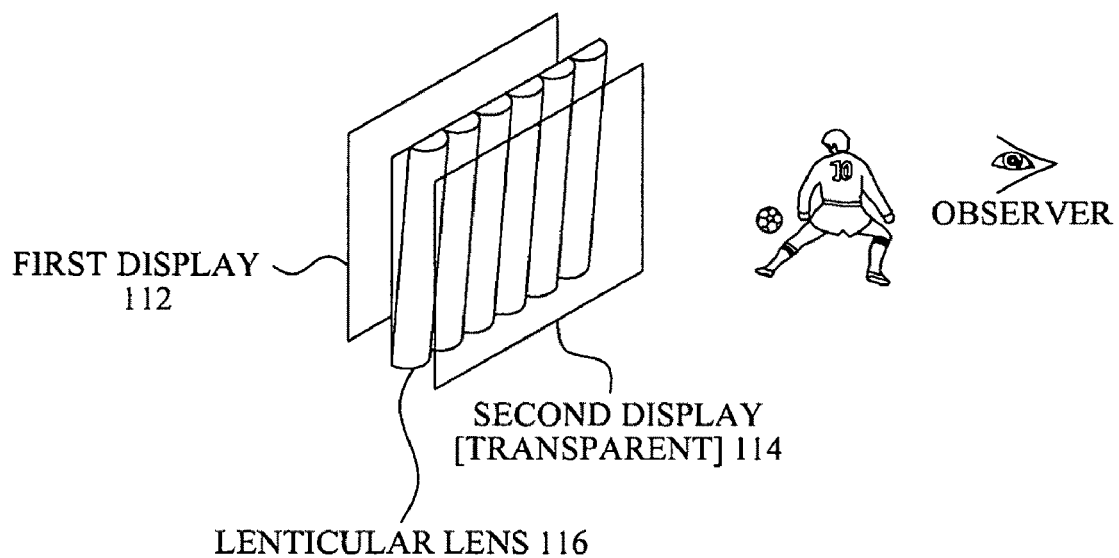
Figure 3A:
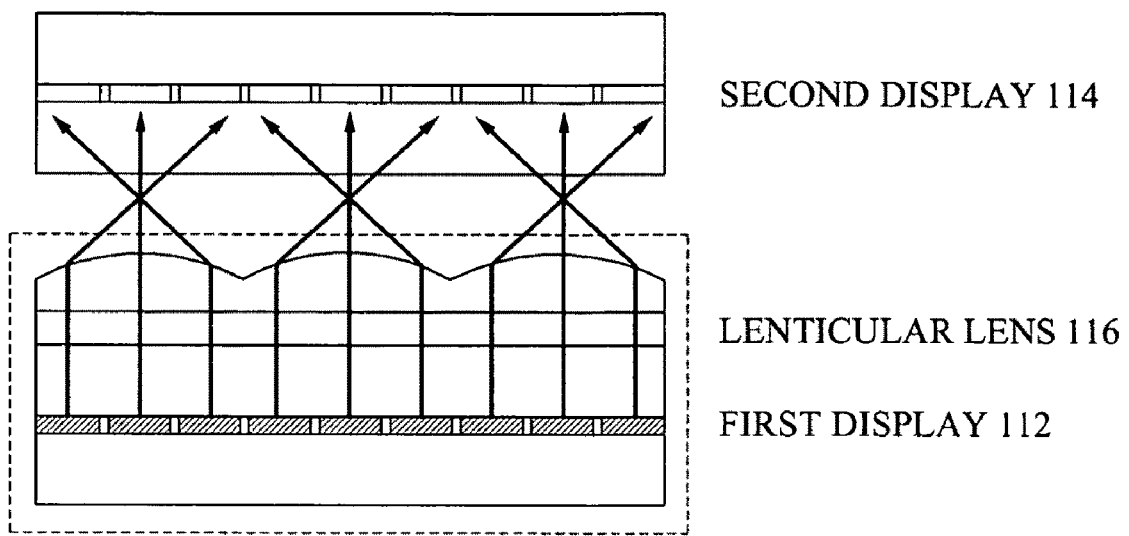
FIGS. 3A and 3B are diagrams illustrating an example of a section of a display unit when outputting a 2D image, and an example of an operation of outputting the 2D image according to exemplary embodiments.
Figure 3B:
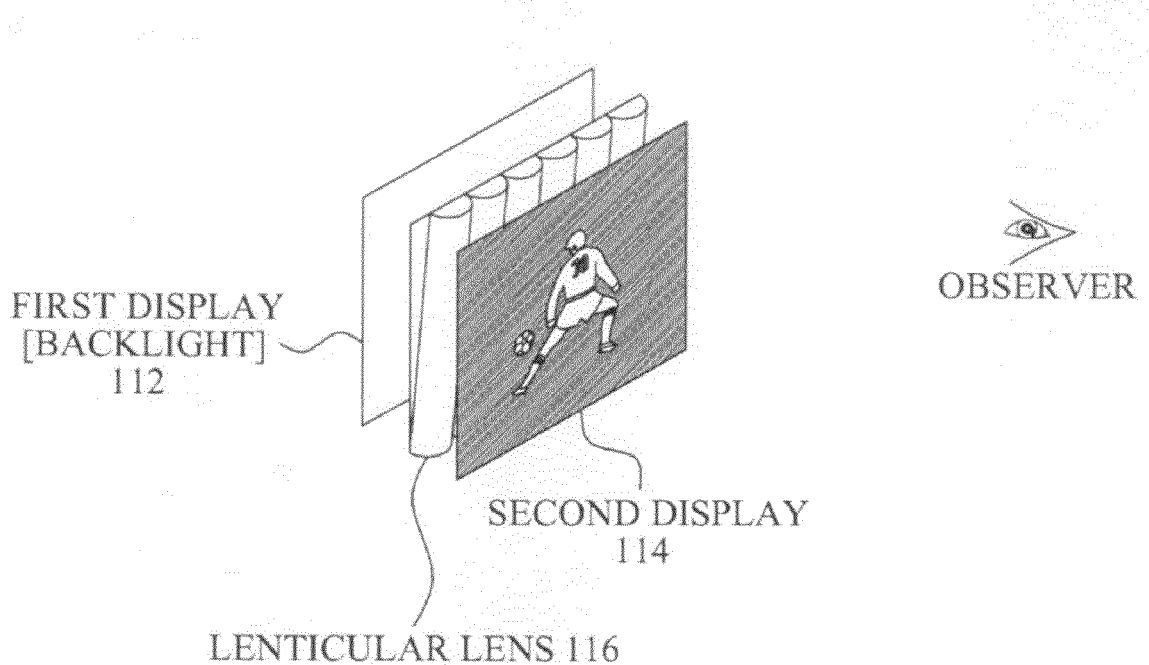

Also, the lenticular lens 116 is not perpendicularly located between the first display 112 and the second display 114, and may be angled by a predetermined angle between the first display 112 and the second display 114 to remove a moiré pattern, as illustrated in FIG. 2B and FIG. 3B. The moiré pattern may be generated when using two displays overlap each other.

The moiré pattern may be an interference pattern created when two grids are overlaid. Also, the moiré pattern may be generated where bright lines are overlapped among the bright lines, and dark lines are overlapped among the dark lines. Also, the moiré pattern may be generated where a bright line is overlapped with a dark line. Accordingly, when using overlapped displays, lines are continuously connected and thus another moiré pattern may be generated.

The control unit 100 may control the first display 112 and the second display 114, and thereby may selectively output a 2D image, 3D image, and hybrid 3D image. Hereinafter, referring to FIG. 2 through FIG. 6, the control unit 100 and the display unit 220 when outputting the 2D image, 3D image, and hybrid 3D image are described in greater detail.

The display unit 110 when outputting the 3D image under the control of the control unit 100 is described with reference to FIGS. 2A and 2B.

FIGS. 2A and 2B are diagrams illustrating an example of a section of a display unit when outputting a 3D image, and an example of an operation of outputting the 3D image according to exemplary embodiments.

FIG. 2A illustrates the section of the display unit 110 when outputting the 3D image. FIG. 2B illustrates an example of an operation state when the display unit 110 outputs the 3D image.

The control unit 100 may control a second display 114 to be operated in a transparent state when outputting the 3D image, as illustrated in FIGS. 2A and 2B. Also, the control unit 110 may control a first display 112 to output an image, and control a lenticular lens 116 to refract light of the image to a plurality of viewpoints to output the 3D image.

A luminance of the outputted 3D image may be different depending on a type of the second display 114. When the second display 114 uses a Red, Green, and Blue (RGB) color panel using red, green, and blue colors, a transmissivity of a color filter is shown in Table 1. Specifically, when outputting the 3D image through the first display 112 and the lenticular lens 116, the second display 114 may control every pixel value to be a white value. When the first display 112 outputs 100% of white light, and the 100% of the white light is passed to the second display 114, only 33% of the white light is finally outputted.

TABLE 1

| | Color filter | | | |
| --- | --- | --- | --- | --- |
| | Red | Green | Blue | Average |
| Transmissivity | 15% | 60% | 23% | 33% |

Also, when the second display 114 uses a Red, Green, Blue, and White (RGBW) color panel using red, green, blue, and white colors, the second display 114 may control every pixel value to be a white value. When the first display 112 outputs a 100% of white light, and the 100% of the white is passed to the second display 114, only 50% of the white light is finally outputted.

When the second display 114 uses a black and white panel, a transmissivity loss may not be generated. However, since the second display 114 uses the black and white panel when outputting the 2D image, the 2D image may be outputted in black and white, and be applied to medical monitoring equipment, and the like.

However, the second display 114 using the black and white panel may increase a frame rate of the 2D image by up to three times, and output the 2D image in colors. For example, when an image available in 60 Hz is operated in 180 Hz, the second display 114 using the black and white panel may display the image in colors. Specifically, when operating in 180 Hz, an image may be divided into red, green, and blue images while displaying a single image, and the three images may be separated in time. When the three images are outputted, a human visual system temporarily merges the divided images and recognizes as a single color image That is, the second display 114 using the black and white panel may output an artifact of an image corresponding to each of the red, green, and blue images, in black and white. Also, the first display 112 may sequentially and repeatedly output red, green, and blue backlights. Accordingly, the 2D image may be outputted in colors.

The display unit 110 when outputting a 2D image under the control of the control unit 100 is described in detail with reference to FIGS. 3A and 3B.

FIGS. 3A and 3B are diagrams illustrating an example of a section of a display unit when outputting a 2D image, and an example of an operation of outputting the 2D image according to exemplary embodiments.

FIG. 3A illustrates the section of the display unit 110 when outputting the 2D image. FIG. 3B illustrates an example of an operation state when the display unit 110 outputs the 2D image.

When outputting the 2D image, a control unit 100 may control a first display 112 to be operated as backlight to provide the backlight to a lenticular lens 116, and control the lenticular lens 116 to scatter the backlight provided from the first display 112, as illustrated in FIGS. 3A and 3B. Accordingly, the control unit 100 may control the scattered backlight to be provided to the second display 114, and control the second display 114 to output the 2D image through the backlight.

The display unit 110 when outputting a hybrid 3D image under the control of the control unit 110 is described in detail with reference to FIG. 4.

When a 3D image outputted through the first display 112 is refracted to a plurality of viewpoints through a lenticular lens 116, a resolution may be reduced as much as a number of viewpoints of the 3D image.

Figure 4:
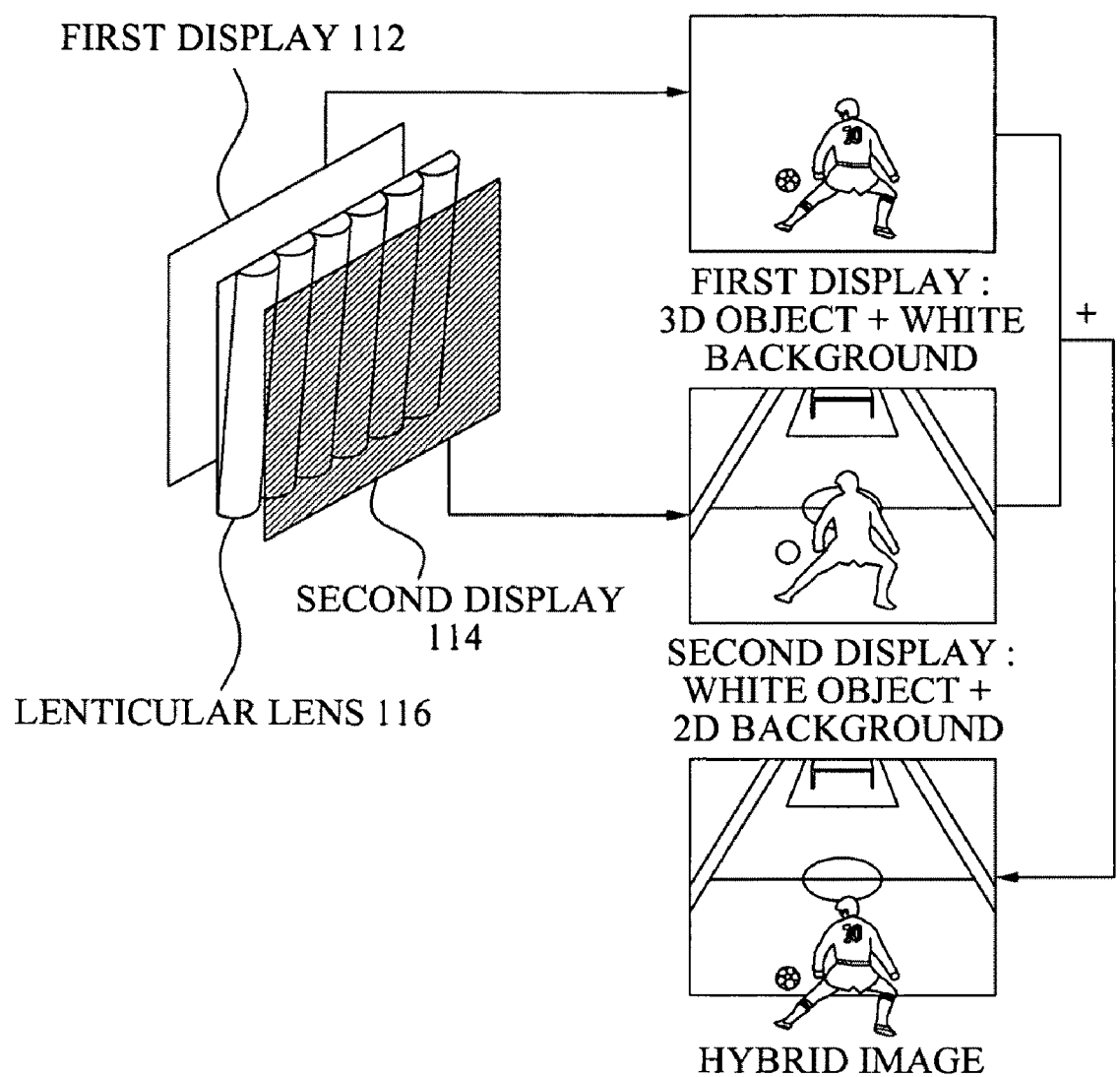
FIG. 4 is a diagram illustrating an example of an operation of combining outputs of two displays and outputting a hybrid 3D image in a 2D/3D switchable autostereoscopic display apparatus according to exemplary embodiments.

FIG. 4 is a diagram illustrating an example of an operation of combining outputs of two displays and outputting a hybrid 3D image in a 2D/3D switchable autostereoscopic display apparatus according to exemplary embodiments. In the hybrid 3D image, an object may be separated from a background. The object is three dimensionally displayed, and the background is two dimensionally displayed. Accordingly, a resolution reduction due to a plurality of viewpoints may be reduced.

A control unit 100 may separate the object from the background in the image, control a first display 112 to output the 3D object, and control a second display 114 to output the 2D background excluding the object to output the hybrid 3D image. In this instance, a background color of the object may be white. Accordingly, an observer may be provided with the object of 3D image and the background of the 2D image, A display unit 110 when outputting the 2D image using a local dimming scheme, for improving a contrast, under the control of the control unit 100 is described in detail with reference to FIGS. 5A and 5B.

Figure 5A:
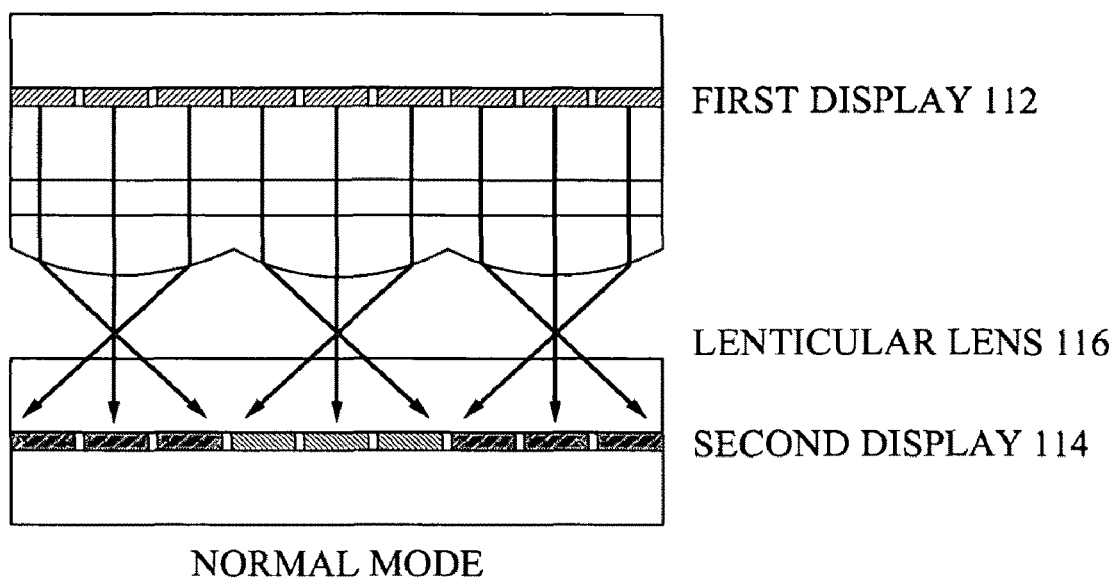
FIGS. 5A and 5B are diagrams illustrating sections of a display unit outputting a 2D image when a local dimming scheme is used and when a local dimming scheme is not used according to exemplary embodiments.
Figure 5B:
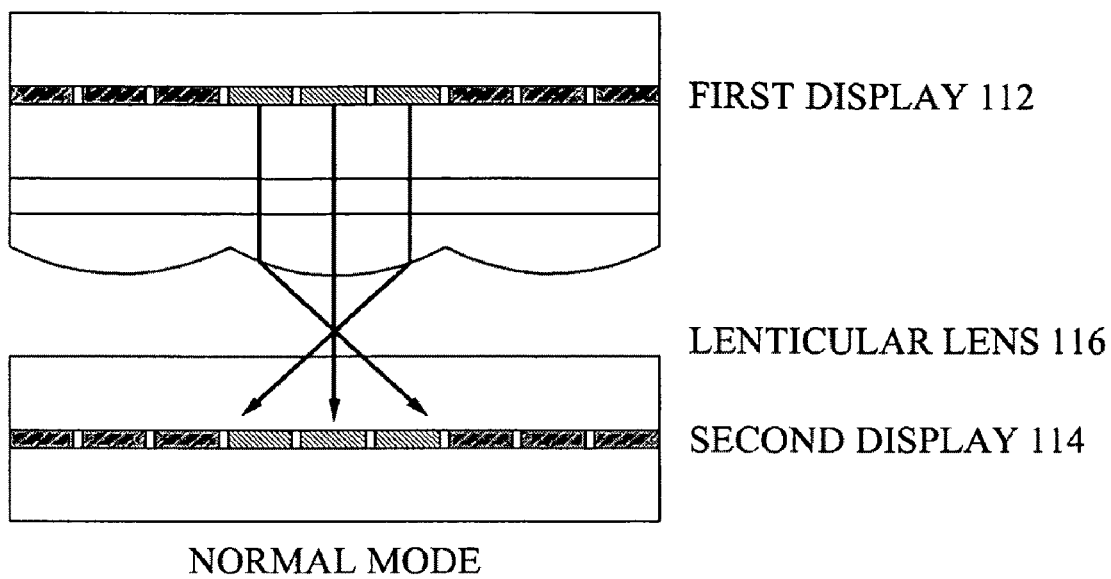

FIGS. 5A and 5B are diagrams illustrating sections of a display unit 110 outputting a 2D image when a local dimming scheme is used and when a local dimming scheme is not used according to exemplary embodiments. FIG. 5A illustrates the section of the display unit 110 when the local dimming scheme is not used when outputting the 2D image. FIG. 5B illustrates the section of the display unit 110 when the local dimming scheme is used when outputting the 2D image.

Referring to FIG. 5A, when a second display 114 outputs a black, white, and black pattern, the control unit 100 may control a first display 112 to provide white light to a location corresponding to each of the black, white, and black. In this instance, the white light may be operated as backlight. Accordingly, even when a middle pixel is outputted in white, the second display 114 may not display the black pixel due to the white light.

Referring to FIG. 5B, when the second display 114 outputs a black, white, and black pattern when using the local dimming scheme, the control unit 100 may control the first display 112 to provide light in the black, white, and black pattern at every pixel unit. Accordingly, backlight is provided to a middle white pixel, and no light is provided to pixels located left and right in the second display 114. Accordingly, a pixel may be outputted in almost black with a higher contrast than the example described with reference to FIG. 2A.

The display unit 110 when outputting a 2D image where a non-uniformity of a luminance is overcome under the control of the control unit 110 is described with reference to FIG. 6.

Figure 6B:
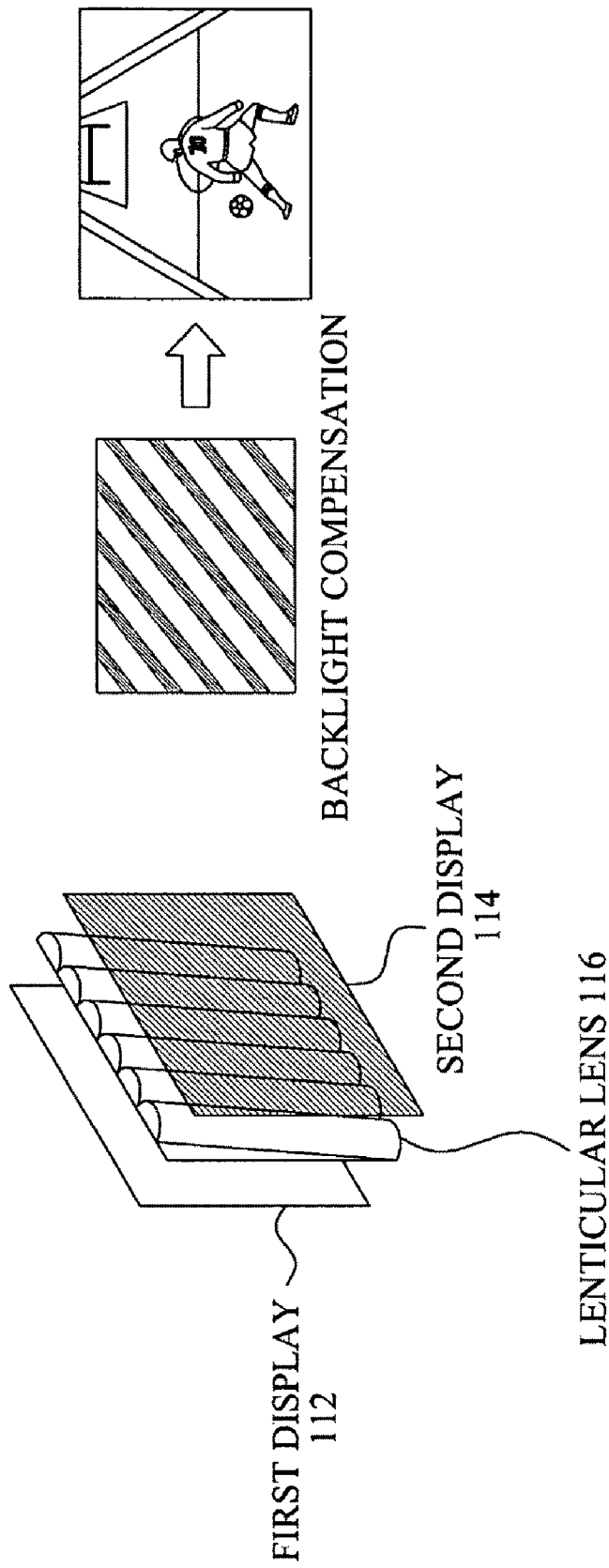

FIGS. 6A and 6B are diagrams illustrating an example of compensating for a luminance non-uniformity that may be generated when a 2D/3D switchable autostereoscopic display apparatus outputs a 2D image.

When outputting the 2D image in the 3D autostereoscopic display apparatus, although a control unit 100 may control a first display 112 to provide full, uniform white light to a second display 114 as illustrated in FIG. 6A, an undesired line artifact may be generated in a direction of a lenticular lens 116 since the lenticular lens 116 is located in front of the first display 112. Accordingly, the control unit 100 may control the first display 112 to provide a backlight image with a line pattern instead of using the full, uniform white light through the firs display 112, as illustrated in FIG. 6B. In this instance, the line pattern is for compensating for the line artifact. Accordingly, the 2D image may be outputted in a uniform luminance.

Hereinafter, an image display method of the 2D/3D switchable autostereoscopic display apparatus is described in detail with reference to FIG. 7.

Figure 7:
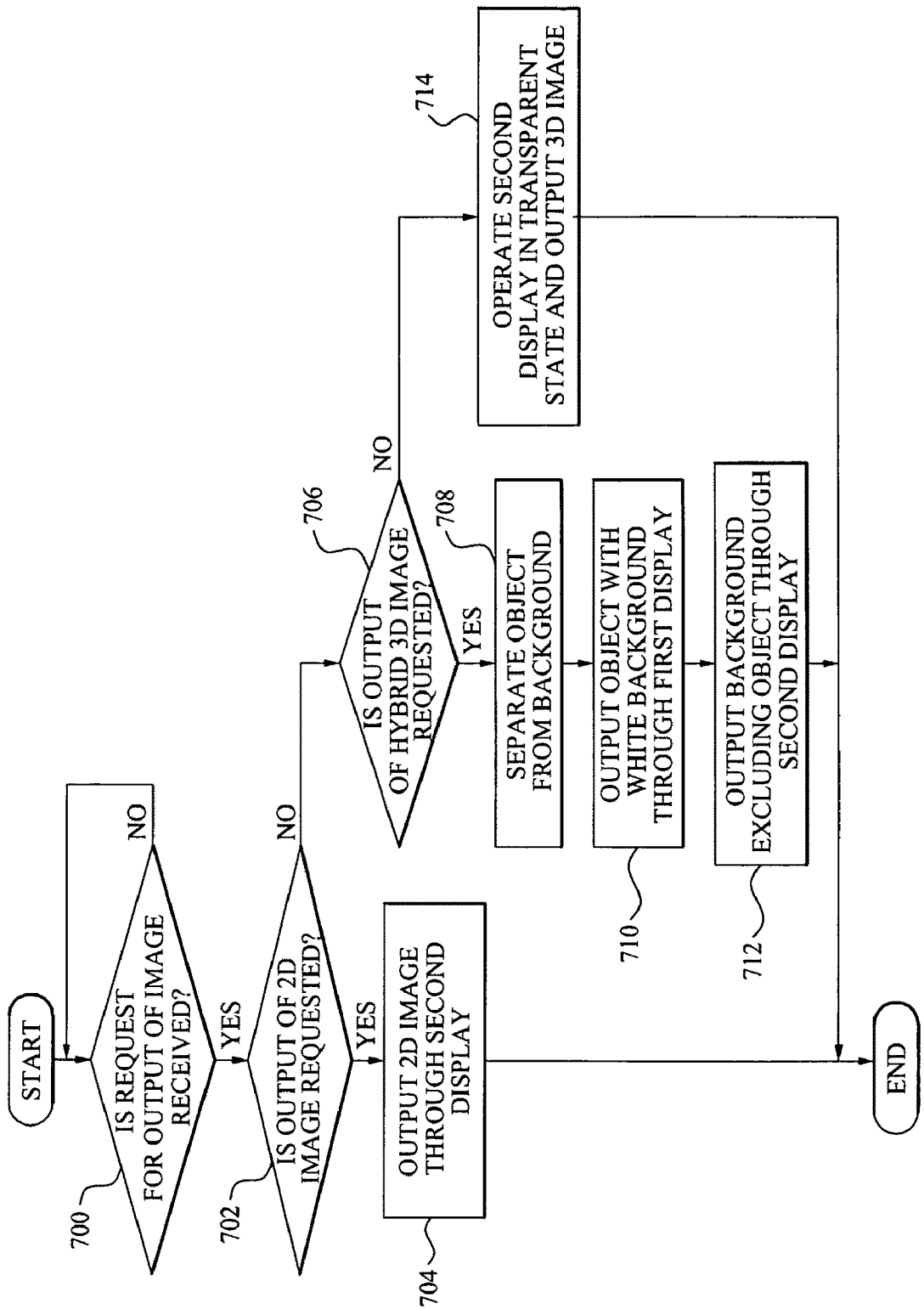
FIG. 7 is a flowchart illustrating a method of selectively outputting 2D/3D images in a 2D/3D switchable autostereoscopic display apparatus according to exemplary embodiments.

FIG. 7 is a flowchart illustrating a method of selectively outputting 2D/3D images in a 2D/3D switchable autostereoscopic display apparatus according to exemplary embodiments. Referring to FIG. 7, in operation S700, the 2D/3D switchable autostereoscopic display apparatus may receive a request for an output of an image. When the request is received, the 2D/3D switchable autostereoscopic display apparatus may determine whether a 2D image is requested to be outputted in operation S702.

When an output of the 2D image is requested, the 2D/3D switchable autostereoscopic display apparatus may control a first display 112 to be operated as backlight, control a second display 114 to output the 2D image, and output the 2D image, in operation S704.

When outputting the 2D image in operation S704, a local dimming scheme described with reference to FIGS. 5A and 5B may be used, or a method of compensating for non-uniformity of luminance described with reference to FIGS. 6A and 6B may be used.

Also, when outputting the 2D image in operation S704, a second display 114 uses a black and white panel, the 2D/3D switchable autostereoscopic display apparatus may increase a frame rate of the 2D image by up to three times, control the first display 112 to sequentially and repeatedly output red, green, and blue backlights. Also, the 2D/3D switchable autostereoscopic display apparatus may control the second display 114 to output an artifact of an image corresponding to each of red, green, and blue backlights as black and white, in order to output the 2D image in colors.

When an output of a 3D image is requested as a result of the determining in operation S702, it is determined whether an output of a hybrid 3D image is requested in operation S706.

When it is determined that the output of the hybrid 3D image is not requested as a result of the determining in operation S706, the 2D/3D switchable autostereoscopic display apparatus may control the second display 114 to be in a transparent state, control the first display 112 to output an image, and control a lenticular lens 116 to refract light of the image to a plurality of viewpoints to output the 3D image.

When it is determined that the output of the hybrid 3D image is requested as a result of the determining in operation S706, the 2D/3D switchable autostereoscopic display apparatus may separate an object from a background in an image to be outputted in operation S708. In operation S710, the 2D/3D switchable autostereoscopic display apparatus may control the first display 112 to output the object. In this instance, a background color of the object is white. In operation S712, the 2D/3D switchable autostereoscopic display apparatus may control the second display 114 to output the background excluding the object. Specifically, in the method of outputting the hybrid 3D image in operation S708 through operation S712, images outputted through the first display 112 and the second display 114 may be combined, and the 3D object and the 2D background may be outputted. Accordingly, a resolution reduction due to a plurality of viewpoints may be reduced, which has been described with reference to FIG. 4.

The image display method of a 2D/3D switchable autostereoscopic display apparatus according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

A 2D/3D switchable autostereoscopic display apparatus according to the above-described exemplary embodiments may include a display unit to include a first display and a second display, and selectively output a 2D image or a 3D image through a lenticular lens located between the first display and the second display; and a control unit to control the first display and the second display to selectively output the 2D image or the 3D image. Accordingly, the 2D/3D switchable autostereoscopic display apparatus may output a 3D image without luminance reduction and output a 2D image without quality deterioration.

Although a few exemplary embodiments have been shown and described, the present disclosure is not limited to the described exemplary embodiments. Instead, it would be appreciated by those skilled in the art that changes may be made to these exemplary embodiments without departing from the principles and spirit of the disclosure, the scope of which is defined by the claims and their equivalents.

What is claimed is:

1. A two dimensional/three dimensional (2D/3D) switchable autostereoscopic display apparatus, the apparatus comprising:
    a display unit to include a first display and a second display, and to output a hybrid 3D image through a lenticular lens located between the first display and the second display; and
    a control unit to control the first display and the second display to output the hybrid 3D image,
    wherein the control unit separates an object from a background in an image, controls the first display to output the object by way of the lenticular lens to three dimensionally display the object, and controls the second display to output the background excluding the object two dimensionally in order to output the hybrid 3D image where reduction of a resolution is reduced, a background color of the object being white.

2. The apparatus of claim 1, wherein, when outputting the hybrid 3D image, the control unit output a white background via the first display and thereby controls the first display to be operated also as backlight to provide the backlight to the lenticular lens, and controls the second display to output an image of the background to output a 2D background image, the second display being provided with the backlight scattered through the lenticular lens.

3. The apparatus of claim 2, wherein, when outputting the 2D background image, the control unit regionally controls a brightness of the backlight, outputted through the first display, depending on an artifact of the background.

4. The apparatus of claim 2, wherein, when outputting the 2D background image, the control unit controls the first display to output a backlight image with a line pattern to remove a line artifact generated due to scattering by the lenticular lens, the line pattern compensating for the line artifact.

5. The apparatus of claim 2, wherein the second display uses a black and white panel, and, when outputting the 2D background image, the control unit increases a frame rate of the 2D image by up to three times, controls the first display to sequentially and repeatedly output red, green, and blue backlights, and controls the second display to output an artifact of the background corresponding to each of the red, green, and blue backlights as black and white to output a 2D background image of a color.

6. The apparatus of claim 1, wherein, when outputting the 3D hybrid image, the control unit controls the second display to be operated in a state where a region of the object is transparent, controls the first display to output an image, and controls the lenticular lens to refract light of the image to a plurality of viewpoints to output a 3D object image.

7. The apparatus of claim 1, wherein the lenticular lens is angled by a predetermined angle between the first display and the second display to remove a moiré pattern.

8. The apparatus of claim 1, wherein the first display corresponds to any one of a Liquid Crystal Display (LCD), a Plasma Display Panel (PDP), an Organic Light Emitting Diode (OLED), and a Projection display.

9. The apparatus of claim 1, wherein the second display corresponds to any one of a Liquid Crystal Display (LCD) and an Organic Light Emitting Diode (OLED).

10. The apparatus of claim 1, wherein the lenticular lens refracts light of an image provided from the first display to a plurality of viewpoints and outputs.

11. A two dimensional/three dimensional (2D/3D) switchable autostereoscopic display method, the image display method comprising:
    receiving a request for an output of a 2D image, a 3D image, or a hybrid 3D image;
    providing backlight to a lenticular lens through a first display when the output of the 2D image is requested; and
    outputting the 2D image through a second display provided with the backlight scattered through the lenticular lens when the output of the 2D image is requested,
    wherein, when the output of the hybrid 3D image is requested, further comprises:
    separating an object from a background in an image to be outputted as the hybrid 3D image;
    outputting the object through the first display, a background color of the object being white; and
    outputting the background excluding the object through the second display,
    wherein the object is three-dimensionally displayed and the background is two dimensionally displayed to output the hybrid 3D image.

12. The image display method of claim 11, wherein a brightness of the backlight is regionally controllable depending on an artifact of an image.

13. The image display method of claim 11, wherein the backlight has a line pattern to compensate for a line artifact to remove the line artifact generated due to scattering by the lenticular lens.

14. The image display method of claim 11, wherein, when the second display uses a black and white panel and the output of the 2D image is requested, further comprises:
    increasing a frame rate of the 2D image to be outputted by up to three times;
    outputting red, green, and blue backlights through the first display sequentially and repeatedly; and
    outputting an artifact of an image corresponding to each of the red, green, and blue backlights as black and white through the second display.

15. The image display method of claim 11, wherein, when the output of the 3D image is requested, further comprises:
    maintaining the second display to be transparent;
    outputting an image through the first display; and
    refracting light of the image outputted through the first display to a plurality of viewpoints through the lenticular lens to output the 3D image.

16. The image display method of claim 11, wherein the lenticular lens is located between the first display and the second display.

17. The image display method of claim 11, wherein the lenticular lens refracts light of an image provided from the first display to a plurality of viewpoints and outputs.

18. The image display method of claim 11, wherein the first display corresponds to any one of a Liquid Crystal Display (LCD), a Plasma Display Panel (PDP), an Organic Light Emitting Diode (OLED), and a Projection display.

19. The image display method of claim 11, wherein the second display corresponds to any one of a Liquid Crystal Display (LCD) and an Organic Light Emitting Diode (OLED).

* * * * *